US010730137B2

(12) United States Patent
Weigl (10) Patent No.: US 10,730,137 B2
(45) Date of Patent: Aug. 4, 2020

(54) APPARATUS AND METHOD FOR MOBILE FRICTION STIR WELDING OF TWO TUBULAR STRUCTURES (71) Applicant: GRENZEBACH MASCHINENBAU GMBH, Asbach-Baeumenheim (DE)

(72) Inventor: Markus Weigl, Donauwoerth (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 336 days.

(21) Appl. No.: 15/548,593

(22) PCT Filed: Feb. 1, 2016

(86) PCT No.: PCT/DE2016/000035
§ 371 (c)(1),
(2) Date: Aug. 3, 2017

(87) PCT Pub. No.: WO2016/124168
PCT Pub. Date: Aug. 11, 2016

(65) Prior Publication Data
US 2018/0021881 A1   Jan. 25, 2018

(30) Foreign Application Priority Data
Feb. 6, 2015   (DE) .................. 10 2015 001 483

(51) Int. Cl.
*B23K 20/00* (2006.01)
*B23K 20/12* (2006.01)
*B23K 37/053* (2006.01)
*B23K 101/06* (2006.01)

(52) U.S. Cl.
CPC .......... *B23K 20/123* (2013.01); *B23K 20/126* (2013.01); *B23K 20/129* (2013.01);
(Continued)

(58) Field of Classification Search
CPC .............. B23K 20/126; B23K 2101/06; B23K 20/1255; B23K 20/129; B23K 37/0533;
(Continued)

(56) References Cited
U.S. PATENT DOCUMENTS 4,336,436 A    6/1982   Dubovetsky et al.
4,623,085 A    11/1986  Dearman
(Continued)

FOREIGN PATENT DOCUMENTS

DE         60026066      11/2006
DE        102006026334   12/2007
(Continued)

*Primary Examiner* — Erin B Saad
(74) *Attorney, Agent, or Firm* — Duane Morris LLP; J. Rodman Steele, Jr.; Gregory M. Lefkowitz (57) ABSTRACT Disclosed are an apparatus and a method for the mobile friction stir welding of two tubular structures as joining partners, said apparatus having the following features: a) an annular main body (2) which can be unfolded using a hinge (4) and can be fixedly connected for operation opposite the hinge (4) using a locking mechanism (1); b) a plurality of lifting elements (3) which are distributed along the circumference of the main body (2), can be moved radially by a drive unit (5), and each include a retaining jaw (15) for securing the tubular structures, one retaining jaw (15) being mounted so as to be horizontally movable by a drive unit (6); c) a ring gear (21) which is connected to the main body (2) and on which a spindle head (11) can be moved by a drive unit (20) in an orbital movement about the tubular structures in order for a weld seam to be applied; d) a welding shoe (27) having a sliding surface (27) which is adapted to the curvature of the surfaces of the joining partners.

8 Claims, 5 Drawing Sheets (52) U.S. Cl.
CPC ...... B23K 20/1285 (2013.01); B23K 37/0533 (2013.01); *B23K 2101/06* (2018.08)

(58) Field of Classification Search
CPC ............... B23K 20/122; B23K 20/123; B23K 20/1245; B23K 20/1225; B23K 20/1235; B23K 20/125; B23K 20/1265; B23K 20/1285; B23K 20/227; B23K 2103/05; B23K 26/0661; B23K 37/02; B23K 37/04; B23K 37/0531; B23K 37/06
See application file for complete search history.

(56) References Cited

U.S. PATENT DOCUMENTS

| | | | |
|---|---|---|---|
| 6,259,052 B1* | 7/2001 | Ding | B23K 20/123 219/59.1 |
| 7,578,643 B1* | 8/2009 | Karow | B23B 5/167 30/97 |
| 7,780,065 B2 | 8/2010 | Vermaat | |
| 8,006,890 B2 | 8/2011 | Okamoto et al. | |
| 2006/0124691 A1* | 6/2006 | Wood | B23K 20/1245 228/2.1 |
| 2008/0296350 A1* | 12/2008 | Henneboehle | B23K 20/1245 228/112.1 |
| 2009/0294511 A1* | 12/2009 | Fleming | B23K 20/125 228/103 |
| 2013/0299561 A1 | 11/2013 | Higgins et al. | |

FOREIGN PATENT DOCUMENTS

| | | |
|---|---|---|
| DE | 202014002642 | 4/2014 |
| EP | 0803314 | 10/1997 |
| EP | 2027962 | 2/2009 |
| EP | 2561948 | 2/2013 |
| EP | 2543460 | 9/2013 |
| WO | 2014056020 | 4/2014 |

* cited by examiner

APPARATUS AND METHOD FOR MOBILE FRICTION STIR WELDING OF TWO TUBULAR STRUCTURES

CROSS-REFERENCE TO RELATED APPLICATIONS

This application is a § 371 national stage entry of International Application No. PCT/DE2016/000035, filed on Feb. 1, 2016, which claims priority to German Patent Application No. 10 2015 001 483.8, filed Feb. 6, 2015, the entire contents of which are incorporated herein by reference.

The invention relates to an apparatus and a method for mobile friction stir welding of two tubular structures. For the welding of the connection of two pipes, use is generally made of what is referred to as orbital welding. Orbital welding is a fully mechanical shielded arc welding method in which an arc is mechanically guided 360 degrees around pipes or other round bodies without interruption. The expression orbital welding is derived here from the Latin "orbis" meaning circle.

With regard to the prior art, among other examples in the patent literature is document EP 2 027 962 A1 which relates to a welding sets and a welding method for orbital welding of pipes. This document mentions some disadvantages of the prior art, the elimination of which is the aim of the application. According to the details in claim 1, an arc welding set is involved here, comprising a welding head for applying a welding arc with welding power to a joining point between a first and a second workpiece in order to produce a weld pool, wherein the welding arc is movable relative to the first and second workpiece. The invention claimed here in the characterizing part of claim 1 is that the welding set comprises a temperature measuring device for measuring a temperature in the environment of the weld pool and a control device, wherein the control device is configured, depending on the measured temperature, to generate at least one signal which serves for controlling at least one welding parameter. Furthermore, it is claimed that the temperature measuring device here is preferably configured as a pyrometer and/or the temperature measuring device is arranged in such a manner that the temperature is measured at at least one temperature measuring point upstream of, next to and/or downstream of the weld pool, wherein the temperature measuring device is preferably arranged in such a manner that it comprises a region, the temperature of which permits a conclusion to be drawn regarding the weld pool temperature.

In general, orbital welding of tubular components with conventional welding methods, such as WIG or MAG welding leads to a very high outlay in respect of process control because of the action of gravity on the melt and the shielding gas.

In addition, when orbital welding is used in the field, for example for buried power lines and pipelines, conventional orbital methods are highly susceptible to the environmental conditions. The wind and moisture which occurs may severely disrupt the welding process here.

With regard to the prior art, reference is furthermore made to EP 2 561 948 A1 which relates to a method and an installation for producing a flange-pipe-flange element by means of friction stir welding.

Such an installation, according to the preamble of claim 11, is based on the aim of simplifying the centering of flange and pipe and of using the weld pool protection in addition to supporting the region softened by friction stir welding also for absorbing contact pressure forces during the friction stir welding and for centering the pipe according to the longitudinal axis of the flanges, with measuring and configuration operations being omitted and while at the same time reducing the manufacturing times, thus saving on material and ensuring economic advantages.

For this purpose, it is claimed in the characterizing part of claim 11 that the weld pool protection is configured as a pneumatically clamping and releasably clamping and supporting disk for centering the pipe on the axis of rotation of the flanges and for absorbing the contact pressure forces during friction stir welding, and that a sensor is provided for scanning the butt joints between pipe and flange, and that furthermore a device is provided for starting up and shutting down a mold wedge in alignment with the tangential plane, which lies horizontally above the axis of rotation and runs through the butt joint, in order to move the friction stir welding probe of the friction stir welding tool out of the friction stir welded butt joint without causing perforations, wherein the sensor and the device for starting up and shutting down the mold wedge are connected to the controller.

The present invention is based on the object of specifying a method and an apparatus which firstly avoids the disadvantages of the prior art and secondly is mobile in respect of its position of use.

This object is achieved by the apparatus as claimed in claim 1, an apparatus for mobile friction stir welding of two tubular structures as joining partners, comprising the following features:

a) an annular basic body (2) which is unfoldable by means of a hinge (4) and can be connected fixedly for operation on the opposite side of the hinge (4) by means of a closure device (1), b) a plurality of lifting elements (3) which are distributed over the circumference of the basic body (2), are movable radially by means of a drive (5) and each have a holding jaw (15) for holding the tubular structures, wherein a holding jaw (15) is mounted in a horizontally displaceable manner by means of a drive (6), c) a toothed ring (21) which is connected to the basic body (2) and on which a spindle head (11) can be moved in an orbital movement about the tubular structures by means of a drive (20) for the application of a weld seam, d) a welding shoe (27) which has a sliding surface (27) which is matched to the curvature of the surfaces of the joining partners, furthermore, it is claimed that the welding shoe (27) has a material outlet region (25) and a chip groove (29), it is claimed that the welding shoe (27) can be moved vertically in an incremental manner in the region of the receiving flange (35) by means of a drive spindle (31) for force control.

Furthermore, it is claimed that sensors (43, 46, 47, 48) are used to detect an inductive power supply and a measuring signal transmitter with an antenna in the region of the bell-shaped holder 33 is used to detect all relevant process parameters during a welding process for incremental force control, and that for holding and fixing the tubular structures, the annular basic body (2) is assigned a second such basic body in the form of a fixing ring (23) which is connected to the first basic body (2) by means of a number of connecting clips (22), wherein the fixing ring (23) has lifting cylinders (3) which are movable radially by means of a drive (5), and the method as claimed in claim 6, a method for mobile friction stir welding of two tubular structures as joining partners, comprising the following features:
a) the two tubular structures to be welded are fixed in their desired position in such a manner that, for the welding process, a suitable annular basic body (2) which is unfoldable by means of a hinge can be placed around the joining partners and completed by an operator by means of a closure device (1) to form a ring,
b) the basic body (2) is equipped with a plurality of lifting elements (3) which are distributed over the circumference of the basic body (2) and each have a holding jaw (15) at their end for contact with the two joining partners, wherein each lifting element is moved in the radial direction by means of a drive (5), which is actuable by an operator, until it is braked by contact with a joining partner and the resistance which is therefore registered, and wherein all of the lifting elements are moved approximately the same distance,
c) after a welding shoe (27) which is suitable for the respective diameter of the joining partners is inserted into the spindle head (11), the process of friction stir welding can begin, wherein easy closing of a weld seam is achieved by the welding shoe being slowly moved further in the direction of the curvature while the welding pin is pulled back slowly, wherein all relevant process parameters during a welding process are detected by means of sensors (43, 46, 47, 48) for incremental force control.

It is claimed that the centering of the basic body (2) with the joining partners takes place entirely or partially under program control by means of the extension of the lifting elements.

Furthermore, it is claimed that the satisfactory functioning of the closure device (1) is ensured by means of an electronic monitoring device.

And a computer program with a program code for carrying out the method steps when the program is executed on a computer, and also a machine-readable storage medium with the program code of a computer program for carrying out the method when the program is executed on a computer.

The apparatus according to the invention is described in more detail below.

At the beginning of the 90s of the last century, friction stir welding was developed. Since then, friction stir welding is being successfully used among other things for the welding of aluminum alloys in many relevant areas of industry. The applications range here from one-off pieces and small batches through to larger batches. Apart from the outstanding quality of the weld seam, other factors contributing to the commercial success are the high degree of reproducibility and the little preparational work and expenditure on finishing. This method can be automated very readily and allows quality monitoring on the basis of machine monitoring. In friction stir welding, frictional heat is generated in the joining region of the materials to be connected by means of the friction between a rotating tool which at the same time is moved translationally and to which pressure is applied. The tool is moved along the joining region and stirs the plasticized material in the interior of the seam of the materials which are to be connected and butt against one another. The applied pressure presses the plasticized material together. At the end of this seam, the tool is withdrawn from the connecting region and the weld seam can be immediately subjected to loading. This technology is used according to the invention for the welding of tubular structures.

In the figures, specifically.

Figure 1:
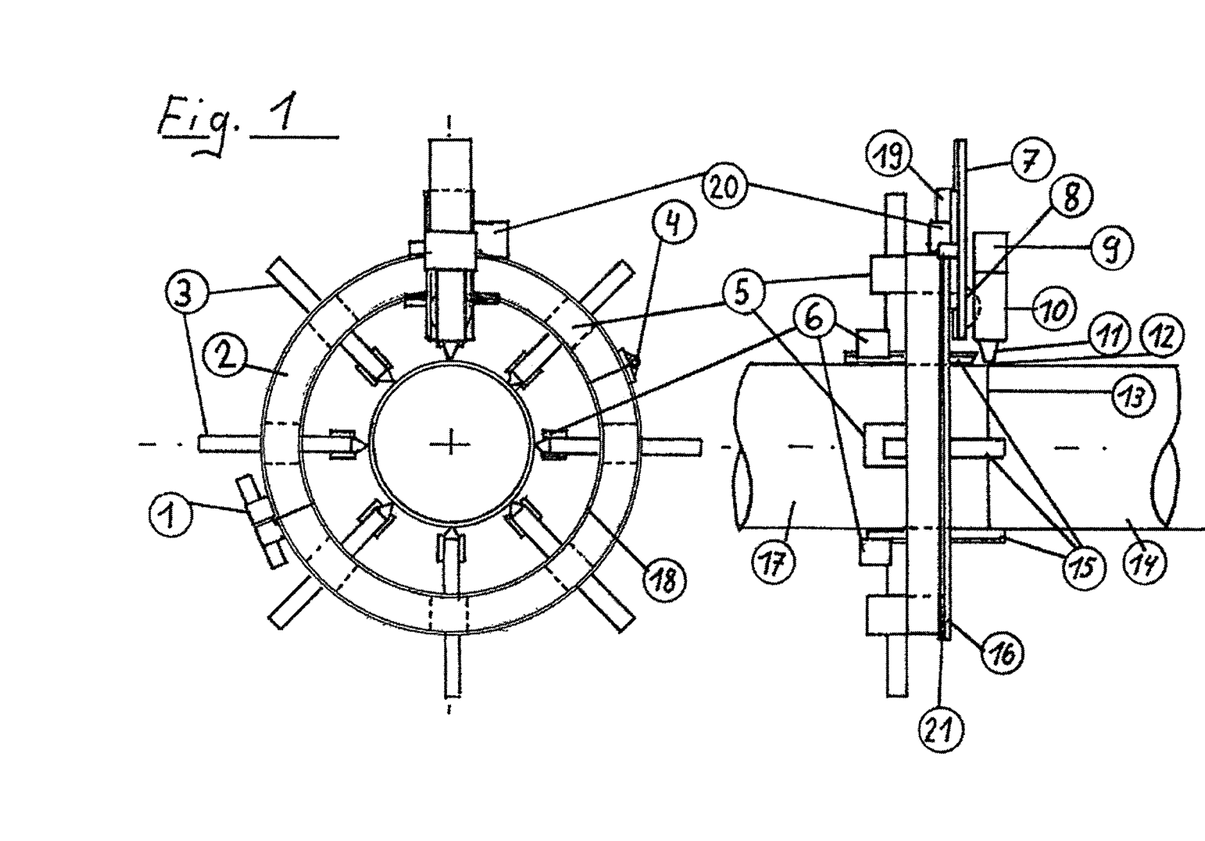
FIG. 1: shows sectional illustrations of an arrangement for friction stir welding

FIG. 1 shows two sectional illustrations of an arrangement for friction stir welding. The left sectional illustration shows an arrangement for mobile friction stir welding during the connection of two pipes. The apparatus used here for the friction stir welding consists of an annular basic body 2 which, in the transportable state, consists of two ring halves which are connected on the one side by means of a hinge 4 and can be connected fixedly for operation on the opposite side by means of a closure device 1. Said closure device 1 can act mechanically by means of a snap closure, a screw connection, electromechanically or hydraulically. In a particular refinement, the satisfactory function of the closure device 1 can be ensured by means of an electronic monitoring device (not illustrated). For the centering and fixing of the annular basic body 2 on the pipes or pipe parts to be welded, a number of lifting elements 3 are fitted into the basic body 2, said lifting elements being distributed over the circumference and each being radially adjustable by means of a drive 5. These can be lifting cylinders or spindle drives. The number and the dimensioning of said lifting elements 3 comply with the diameter of the pipes to be welded. By way of example, eight lifting elements 3 are shown in FIG. 1. The radially effective adjustability of each lifting element 3 in the basic body 2 therefore ensures the application of the presented arrangement for friction stir welding in a certain region of the pipe diameter to be processed. Basic bodies 2 of different sizes therefore have to be provided when such a region is exceeded or fallen short of. The inner guide web 18 of the basic body 2 is shown in the left sectional illustration.

In the right sectional illustration of FIG. 1, the pipe parts to be welded can be seen in side view, wherein the front joining partner is denoted by 17 and the rear joining partner by 14. In the right sectional illustration, a respective drive 6 for moving a holding jaw 15 of each lifting element in the horizontal direction can be seen on that side of each lifting element 3 which faces the pipe parts to be welded, wherein said drive cannot be illustrated so clearly in the left sectional illustration. The drive 6 ensures that a respective holding jaw 15 can be pulled back in the direction of the basic body 2 when the welding operation enters the region of the respective holding jaw as the spindle head 11 which brings about the friction stir welding operation revolves. This can be seen in the right sectional illustration in the region of the weld seam 13 on the upper side of the front joining partner 17 and of the rear joining partner 14.

During the displacement of a holding jaw 15 in the horizontal direction, it is ensured via a controller that, by means of the drive 5 for the movement of a lifting element 3, a slight loosening of the respective lifting element is provided in order to permit the movement of the respective holding jaw in the horizontal direction.

The drive 5 for the movement of a lifting element 3 in the vertical direction can be seen on the rear side of the annular basic body. On the other side of the basic body 2, a vertical carriage 7 with a suspension means 8 and a drive 9 for the spindle head 11 is illustrated on the upper side of the two joining partners. A drive 19 for the force-controlled vertical movement of the housing 10 of the spindle head 11 supplies the necessary contact pressure during the friction stir welding operation. A toothed ring 21 on the annular basic body 2, along which a drive 20 runs, permits the orbital movement of the spindle head 11 for application of a weld seam by means of a friction welding pin 12.

The outer guide web 16 of the basic body 2 is shown in the right sectional illustration.

The fundamental centering of the basic body (2) with the two joining partners can take place in the simplest case by an operator. For a necessary, more exact positioning, each lifting element can in each case be provided with a laser distance sensor (not shown and denoted specifically). The effect can thereby be automatically achieved that each lifting cylinder is extended an equal distance and therefore the basic body (2) is centered on the two joining partners. Instead of manual basic centering, it can be provided, in a special constructional form, that, after manual closing of the annular basic body, each lifting element is automatically extended simultaneously until all of the lifting elements, after program-controlled corrections, are at the same distance from the joining partners.

Figure 2:
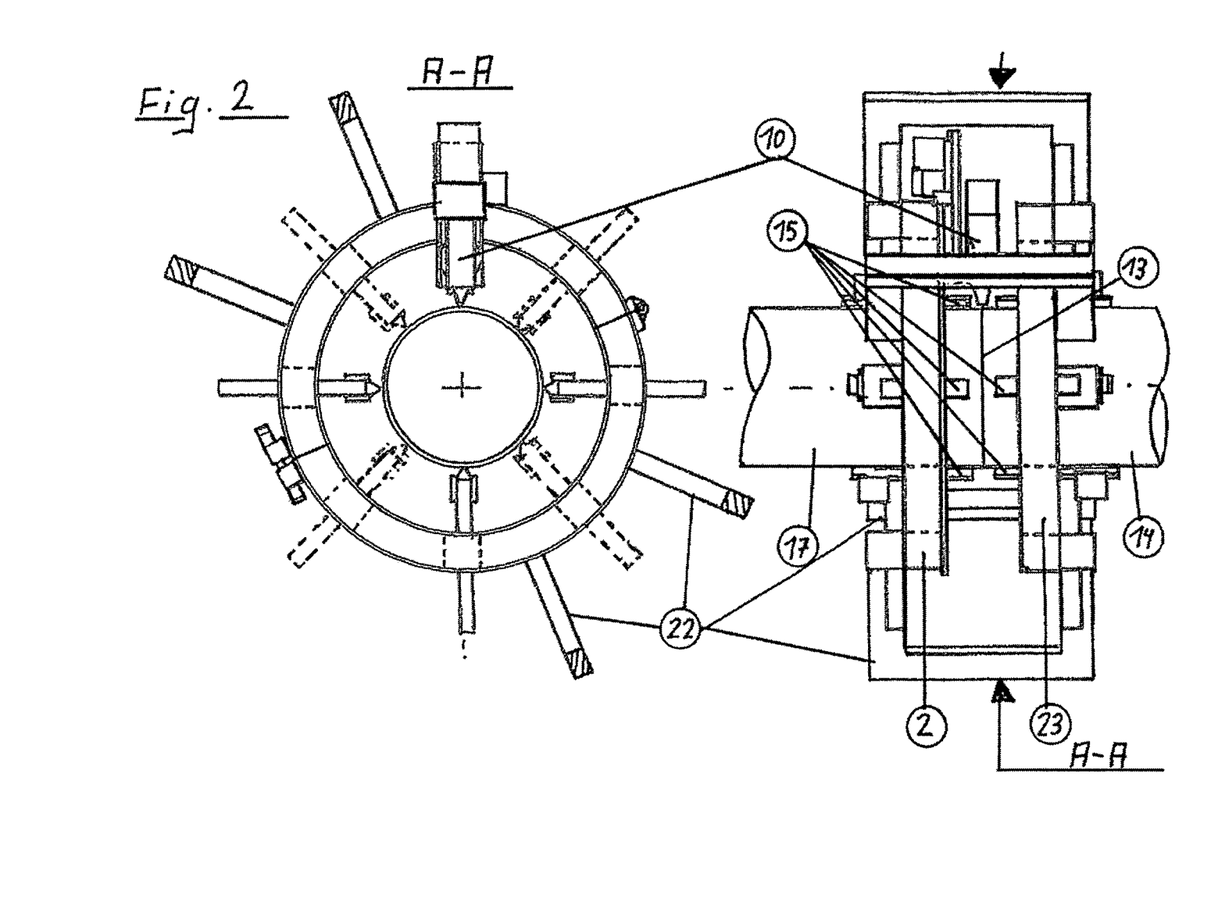
FIG. 2: shows sectional illustrations of an alternative arrangement to FIG. 1
FIG. 3: shows a sectional illustration with a welding shoe

FIG. 2 shows a sectional illustrations of an alternative arrangement to FIG. 1. This variant is particularly suitable for large outside diameters of the pipes and high welding forces, in particular in the case of a high pipe wall thickness. The two pipe parts to be welded are not fixed here by means of the holding jaws 15, which are mounted on an individual annular basic body 2, for the welding operation, but rather, for the fixing of the second pipe part, use is made of a second annular basic body in the form of a fixing ring 23 which is connected to the other annular basic body 2 by means of a number of connecting clips 22. This means that, in this arrangement, the drive 6 for moving the respective holding jaws 15 in the horizontal direction is not necessary since the holding jaws 15 of the two basic bodies 2 and of the fixing ring 23 permit free access to the weld seam 13.

Figure 3:
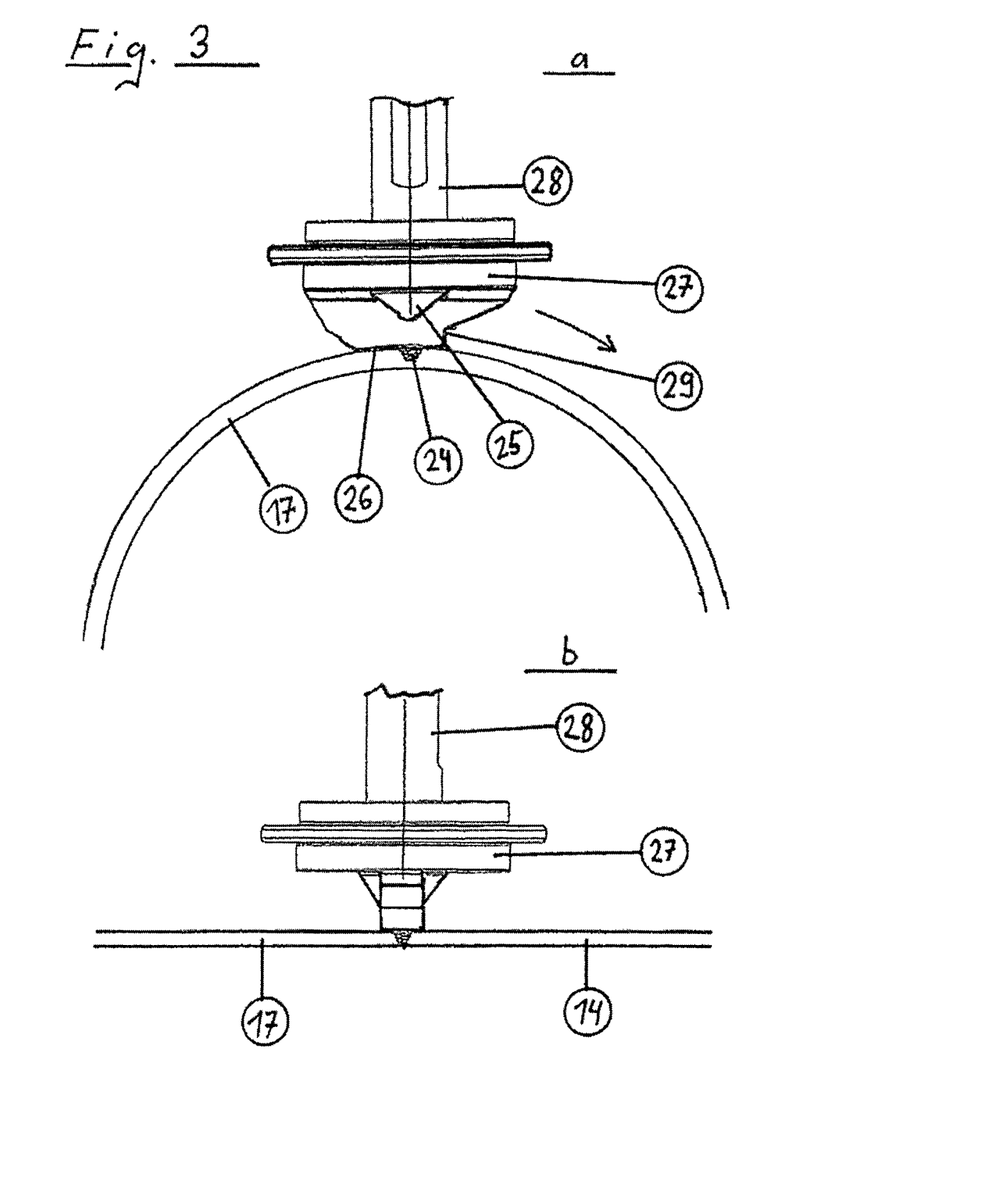

FIG. 3 shows a sectional illustration with a welding shoe. The upper part a) of FIG. 3 shows here a section transversely with respect to the two tubular structures from the view of the front joining partner 17, while the lower part b) of FIG. 3 shows a section along the two tubular structures front joining partner 17 and of the rear joining partner 14.

In the upper part a) of FIG. 3, the welding pin 24 of the welding shoe 27 can be seen together with the pin bearing which is connected to the spindle head via a pin stem 28. The sliding surface 26 of the welding shoe 27 is matched in shape in its curvature to the surface curvature of the two joining partners. It is apparent that here, within certain limits, the sliding surface of a welding shoe 27 can follow the different curvatures of different joining partners, but, in principle, a different curvature of the joining partners also requires a different curvature of the sliding surface 26. At least, certain diameter ranges require certain shape adaptations. The effect can therefore be achieved that more than just one pipe diameter can be covered with one specific tool. In this illustration, a side of the material outlet region 25 can also be seen. What is referred to as a chip groove 29 can also be seen here in section. This is an edge on the welding shoe 27, allowing welding material which has been thrown up, as seen in the direction of movement of the welding shoe 27, to exit in a defined manner in principle. In this connection, the effect occurs that, after a certain time, this material which has accumulated at the chip groove is detached by itself without interfering with the friction stir welding process. This is particularly of importance during the welding of tubular structures since undesirable score marks can easily be formed here in the material next to the weld seam. The service life of a welding shoe 27 as a tool is thereby significantly increased.

In the lower part b) of FIG. 3, the pin stem 28 of the welding shoe 27 is illustrated rotated by 90 degrees, wherein the front joining partner 17 and the rear joining partner 14 are identified.

During the friction stir welding of tubular structures, problem-free closing of a weld seam without what is referred to as "perforation" can be achieved by the fact that, at the corresponding "end point" of a weld seam, the welding shoe concerned is moved slowly further forward in the direction of the curvature while the welding pin is pulled slowly back.

Figure 4:
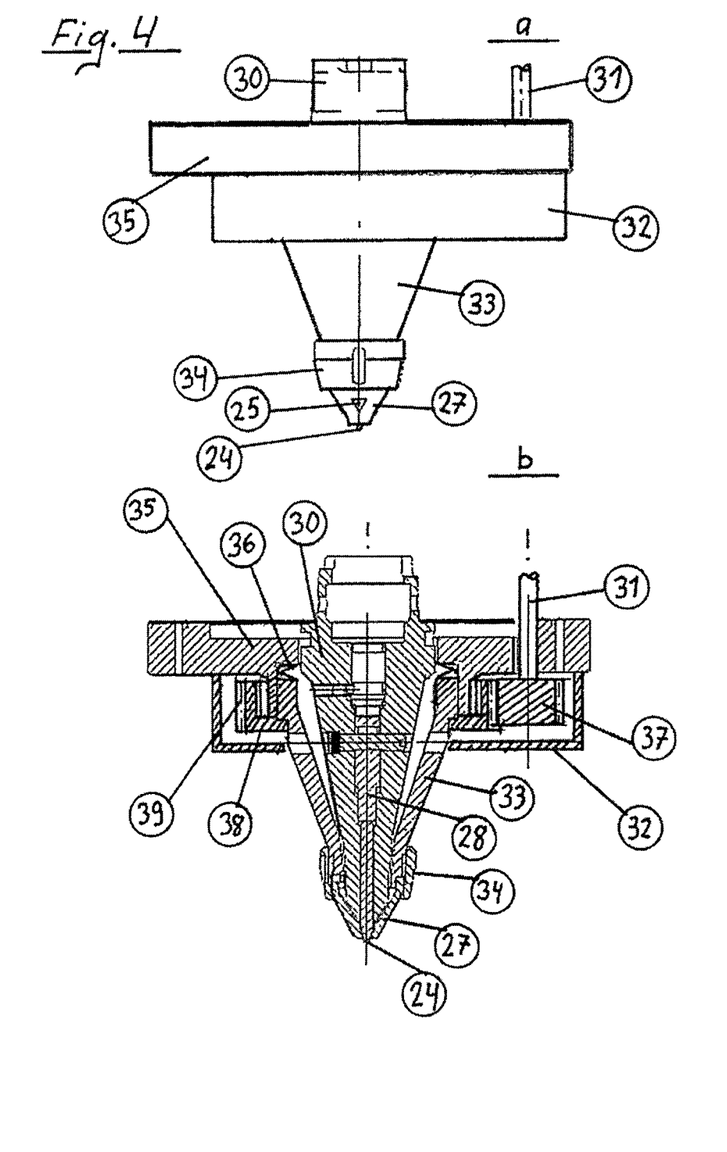
FIG. 4: shows a sectional illustration of the vertical movement of a welding shoe

FIG. 4 shows a sectional illustration of the vertical movement of a welding shoe. In the upper part a) of FIG. 4, the outer view of the holder of a welding shoe is shown, and the sectional drawing thereof is shown in the lower part b). In the upper region, the holder for introducing the force of the pin receiving cone 30 for the friction stir welding operation can be seen, while the receiving flange 35 produces the mechanical connection to the spindle head. The housing 32 which is furthermore shown contains the mechanism for lowering the bell-shaped holder 33 for a welding shoe, wherein said mechanism is triggered from the outside by means of a driving spindle 31. A welding shoe is fastened to the bell-shaped holder 33 by means of the union nut 34. Of the welding shoe 27 which is shown, the welding pin 24 and the material outlet region 25 are identified.

In the sectional drawing b) of FIG. 4, the pin receiving cone 30 with its pin stem 28 can be seen over its entire length. The bore for receiving the driving spindle 31 can be seen on the right side through the receiving flange 35, wherein the end of the driving spindle 31 bears a driving pinion 37 which engages in the toothed ring of the external toothing 39 of the union nut 38, wherein the bell-shaped holder 33 is fastened in a sliding manner to the receiving flange 35 by means of the fine thread 50 of the union nut 38. It is ensured by means of a pressure element 36 which acts on the bell-shaped holder 33 from above that the bell-shaped holder 33 and therefore the welding shoe 27, which is fastened to the bell-shaped holder 33 by means of the union nut 34, move downward during a corresponding rotation of the driving spindle 31. During an opposed rotation of the driving spindle 31, the bell-shaped holder 33 moves upward. A fine thread 50 provided on the bell-shaped holder 33 in the region of the union nut 38 could not be illustrated more clearly for graphical reasons. The welding pin 24 is identified at the end of the welding shoe 27. An incremental force control during the welding process is thereby made possible in real time by means of the process parameters. This is not possible in the case of conventional orbital welding.

Figure 5:
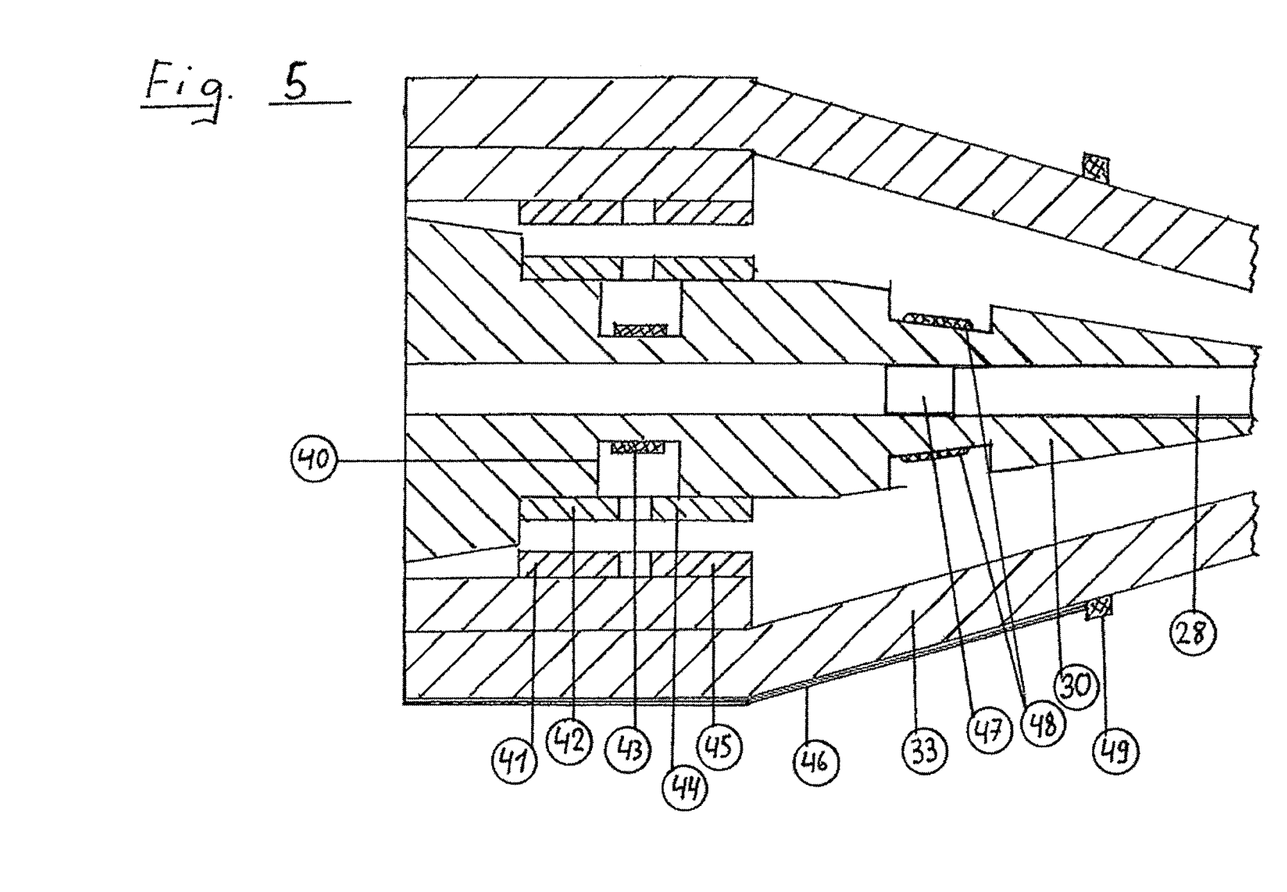
FIG. 5: shows a sectional illustration of the detection of the process parameters.

FIG. 5 shows a sectional illustration of the detection of the process parameters by a cross section of the bell-shaped holder 33 with the pin receiving cone 30 arranged centrally in the longitudinal direction. The pin receiving cone 30 which is shown together with its pin stem 28 makes it possible here to see in its wider region a cone notch 40 which serves for receiving a sensor 43. The mechanical cross-sectional constriction by the cone notch 40 and the placing of the sensor 43 which has taken place at this point (for example in the form of a DMS) permit measurement of the torque acting on the pin receiving cone 30 and measurement of a bending moment which occurs here. Directly at the lower edge of the bell-shaped holder 33 which is shown, a linear sensor 46 can be seen which is generally attached to that side of the bell-shaped holder 33 which is opposite the flow direction of the welding process, and in which an associated measuring amplifier 49 and a measured value transmitter with an antenna transmitting the measuring signals further are identified. The sensor 36 is generally a strain gauge which registers even a minimum distortion of the bell-shaped holder 33 during the welding process.

The internal signal transmission of the measured values determined by the sensor 43 takes place via a rotatable signal amplifier 44, which is connected to the pin receiving cone 30, and a rotor antenna. The reception and forwarding of the by the sensor 44 takes place via a statically fixed antenna 45.

Located in the front region of the pin receiving cone is a further notch (not identified specifically) which provides space for a sensor 48 and which permits the measurement of the axial force acting directly on the pin stem 28, and therefore on the welding pin.

A piezoelectric force-measurement sensor 47 which likewise serves for measuring the axial force and by means of which the length dimensioning of a welding pin tip is also possible, is optionally located in the longitudinal axis of the pin stem 28. For the power supply of the measuring systems described, use is made of an inductive power supply, the static primary winding of which is identified by 41 and the movable secondary winding of which is identified by 42.

It is therefore ensured that the sensors 43, 46, 47 and 48 can be used to detect an inductive power supply and a measuring signal transmitter with an antenna in the region of the bell-shaped holder 33 can be used to detect all of the relevant process parameters during a welding process and these can be utilized during the welding process in real time for optimum control.

The complex control of the movement sequences described requires a special control program.

LIST OF DESIGNATIONS

1 Closure device
2 Annular basic body
3 Lifting element for centering and fixing
4 Hinge of the annular basic body 2
5 Drive for a lifting cylinder 3 in the radial direction
6 Drive for a lifting cylinder 3 in the horizontal direction
7 Vertical carriage for the spindle unit
8 Suspension means for the spindle head
9 Drive for the spindle head
10 Housing of the spindle head
11 Spindle head
12 Friction welding pin
13 Weld seam
14 Rear joining partner
15 Holding jaw
16 Outer guide web of the basic body 2
17 Front joining partner
18 Inner guide web of the basic body 2
19 Drive for the vertical movement of the spindle head 10
20 Drive for the orbital movement of the spindle head
21 Toothed ring for the drive 20 for the orbital movement
22 Connecting clip
23 Fixing ring
24 Welding pin
25 Material outlet region
26 Sliding surface of the welding shoe
27 Welding shoe with pin bearing
28 Pin stem
29 Chip groove
30 Pin receiving cone
31 Driving spindle for lowering the bell-shaped holder
32 Housing
33 Bell-shaped holder for the welding shoe
34 Union nut for fastening the welding shoe
35 Receiving flange
36 Compression spring element for lowering the bell-shaped holder
37 Driving pinion of the union nut of the bell-shaped holder 33
38 Union nut of the bell-shaped holder 33
39 External toothing of the union nut 38
40 Cone notch for receiving a sensor
41 Primary winding of an inductive power supply
42 Secondary winding of an inductive power supply
43 Sensor (DMS) for the tool receiving cone
44 Sensor signal amplifier
45 Static antenna
46 Sensor on the bell-shaped holder 33 (DMS)
47 Piezoelectric force-measurement sensor
48 Sensor for measuring the axial force
49 Amplifier of the measuring signals of the bell-shaped tool, with transmitter and antenna
50 Fine thread

The invention claimed is:

1. An apparatus for mobile friction stir welding of two tubular structures as joining partners, comprising the following features:
   a) an annular base body (2) which is unfoldable by means of a hinge (4) and can be connected fixedly for operation on the opposite side of the hinge (4) by means of a closure device (1),
   b) a plurality of lifting elements (3) which are distributed over the circumference of the base body (2), are movable radially by means of a drive (5) and each have a holding jaw (15) for holding the tubular structures, wherein the holding jaw (15) is mounted in a horizontally displaceable manner by means of a drive (6),
   c) a guide ring (21) which is connected to the base body (2) and on which a spindle head (11) can be moved in an orbital movement about the tubular structures by means of a drive (20) for the application of a weld seam, and
   d) a welding shoe (27) comprising a longitudinally-extending projection including a joining partner contacting surface comprising a sliding surface (26), which is matched to the curvature of the surfaces of the joining partners, and a chip groove (29), which comprises a leading portion that extends generally perpendicular to joining partners being welded then continues forward with a concave portion.

2. The apparatus as claimed in claim 1, wherein the welding shoe (27) comprises a material outlet region (25) extending laterally away from the longitudinally-extending projection.

3. The apparatus as claimed in claim 1, characterized in that the welding shoe (27) can be moved vertically in an incremental manner in the region of a receiving flange (35) by means of a drive spindle (31) for force control.

4. The apparatus as claimed in claim 1, characterized in that sensors (43, 46, 47, 48) are used to detect an inductive power supply and a measuring signal transmitter with an antenna in a region of a generally-conical holder 33 is used to detect all relevant process parameters during a welding process for incremental force control.

5. The apparatus as claimed in claim 1, characterized in that, for holding and fixing the tubular structures, the annular base body (2) is assigned a second such base body in the form of a fixing ring (23) which is connected to the first base body (2) by means of a number of connecting clips (22), wherein the fixing ring (23) has lifting cylinders (3) which are movable radially by means of a drive (5).

6. A method for mobile friction stir welding of two tubular structures as joining partners with an apparatus of claim 1, comprising the following features:
   a) fixing the two tubular structures to be welded in their desired position in such a manner that, for the welding process, a suitable annular base body (2) which is unfoldable by means of a hinge can be placed around the joining partners and completed by an operator by means of a closure device (1) to form a ring,
   b) the base body (2) is equipped with a plurality of lifting elements (3) which are distributed over the circumference of the base body (2) and each have a holding jaw (15) at their end for contact with the two joining partners, wherein each lifting element is moved in the radial direction by means of a drive (5), which is actuable by an operator, until it is braked by contact with a joining partner and the resistance which is therefore registered, and wherein all of the lifting elements are moved approximately the same distance,
   c) inserting a welding shoe (27) which is suitable for the respective diameter of the joining partners into the spindle head (11), then beginning the process of friction stir welding, wherein easy closing of a weld seam is achieved by the welding shoe being slowly moved further in the direction of the curvature while the welding pin is pulled back slowly, wherein all relevant process parameters during a welding process are detected by means of sensors (43, 46, 47, 48) for incremental force control.

7. The method as claimed in claim 6, characterized in that the centering of the base body (2) with the joining partners takes place entirely or partially under program control by means of the extension of the lifting elements.

8. The method as claimed in claim 6, characterized in that the satisfactory functioning of the closure device (1) is ensured by means of an electronic monitoring device.

* * * * *